(12) United States Patent
Schuett et al.

(10) Patent No.: US 10,893,190 B2
(45) Date of Patent: Jan. 12, 2021

(54) TRACKING IMAGE COLLECTION FOR DIGITAL CAPTURE OF ENVIRONMENTS, AND ASSOCIATED SYSTEMS AND METHODS

(71) Applicant: PreNav, Inc., San Carlos, CA (US)

(72) Inventors: Nathan Schuett, Belmont, CA (US); Asa Hammond, Cotati, CA (US)

(73) Assignee: PreNav, Inc., Redwood City, CA (US)

( * ) Notice: Subject to any disclaimer, the term of this patent is extended or adjusted under 35 U.S.C. 154(b) by 0 days.

(21) Appl. No.: 15/882,921

(22) Filed: Jan. 29, 2018

(65) Prior Publication Data

US 2019/0037133 A1    Jan. 31, 2019

Related U.S. Application Data

(60) Provisional application No. 62/453,965, filed on Feb. 2, 2017.

(51) Int. Cl.
*G06K 9/00* (2006.01)
*H04N 5/232* (2006.01)
(Continued)

(52) U.S. Cl.
CPC ....... *H04N 5/23222* (2013.01); *G01C 21/206* (2013.01); *G03B 17/561* (2013.01); *G06F 3/14* (2013.01); *G06K 9/00664* (2013.01); *G06T 7/246* (2017.01); *G06T 7/248* (2017.01); *G06T 7/74* (2017.01); *H04N 13/111* (2018.05);
(Continued)

(58) Field of Classification Search
None
See application file for complete search history.

(56) References Cited

U.S. PATENT DOCUMENTS

| | | |
|---|---|---|
| 5,243,370 A | 9/1993 | Slater |
| 7,970,532 B2 | 6/2011 | Tehan et al. |
(Continued)

FOREIGN PATENT DOCUMENTS

| | | |
|---|---|---|
| EP | 2511781 | 10/2012 |
| EP | 2772725 | 9/2014 |
(Continued)

OTHER PUBLICATIONS

International Search Report and Written Opinion for International Patent Application No. PCT/US2018/015788, Applicant: PreNav Inc., dated Mar. 29, 2018, 16 pages.

(Continued)

*Primary Examiner* — Shadan E Haghani
(74) *Attorney, Agent, or Firm* — Perkins Coie LLP (57) ABSTRACT

Collecting images for digital capture of real world environments, and associated systems and methods are disclosed. A representative method for digitally capturing the environment includes scanning an environment with a laser scanner from at least one fixed point to obtain scan data and, based at least in part on the scan data, creating a view capture route corresponding to a path in the environment. The method can further include receiving optical data from a human operator carrying an optical sensor as the human operator travels along the view capture route. The method can still further include generating a virtual (or other) representation of the environment, based at least in part on the optical data.

21 Claims, 11 Drawing Sheets

(51) Int. Cl.
    *G06T 7/246*     (2017.01)
    *H04N 13/271*     (2018.01)
    *H04N 13/254*     (2018.01)
    *H04N 13/111*     (2018.01)
    *G06T 7/73*     (2017.01)
    *H04N 13/239*     (2018.01)
    *G01C 21/20*     (2006.01)
    *G03B 17/56*     (2006.01)
    *G06F 3/14*     (2006.01)
    *H04N 13/106*     (2018.01)

(52) U.S. Cl.
    CPC ......... *H04N 13/239* (2018.05); *H04N 13/254* (2018.05); *H04N 13/271* (2018.05); *G06T 2207/10028* (2013.01); *G06T 2207/30241* (2013.01); *G06T 2207/30244* (2013.01); *H04N 13/106* (2018.05); *H04N 2213/001* (2013.01)

(56) References Cited

U.S. PATENT DOCUMENTS

| | | |
|---|---|---|
| 8,301,326 B2 | 10/2012 | Malecki et al. |
| 9,073,637 B2 | 7/2015 | Ohtomo et al. |
| 9,174,733 B1 | 11/2015 | Burgess et al. |
| 9,262,929 B1 | 2/2016 | Roy et al. |
| 9,274,521 B1 | 3/2016 | Stefani et al. |
| 9,322,646 B2* | 4/2016 | Pochiraju ................. G01C 3/08 |
| 9,354,606 B1 | 5/2016 | Georges, III |
| 9,383,753 B1 | 7/2016 | Templeton et al. |
| 9,773,420 B2 | 9/2017 | Ohtomo et al. |
| 9,857,470 B2* | 1/2018 | Hilliges ................. G01S 17/89 |
| 10,289,990 B2* | 5/2019 | Rizzolo ............ G06K 19/06028 |
| 2003/0231793 A1 | 12/2003 | Crampton |
| 2004/0109012 A1 | 6/2004 | Kraus et al. |
| 2005/0057741 A1 | 3/2005 | Anderson |
| 2008/0075325 A1 | 3/2008 | Otani et al. |
| 2009/0076665 A1 | 3/2009 | Hoisington et al. |
| 2009/0323121 A1 | 12/2009 | Valkenburg et al. |
| 2010/0208235 A1 | 8/2010 | Kaehler |
| 2010/0283681 A1 | 11/2010 | Remondi et al. |
| 2010/0286859 A1 | 11/2010 | Feigh et al. |
| 2010/0292871 A1 | 11/2010 | Schultz et al. |
| 2012/0057174 A1 | 3/2012 | Briggs |
| 2012/0136630 A1 | 5/2012 | Murohy et al. |
| 2012/0262708 A1 | 10/2012 | Connolly |
| 2013/0024411 A1 | 1/2013 | Cai et al. |
| 2013/0135479 A1 | 5/2013 | Bregman-Amitai et al. |
| 2013/0301905 A1 | 11/2013 | Malecki et al. |
| 2013/0314502 A1 | 11/2013 | Urbach et al. |
| 2013/0317667 A1 | 11/2013 | Kruglick |
| 2014/0023381 A1 | 1/2014 | Hunt et al. |
| 2014/0046589 A1 | 2/2014 | Metzler et al. |
| 2014/0163775 A1 | 6/2014 | Metzler et al. |
| 2014/0176677 A1 | 6/2014 | Valkenburg et al. |
| 2014/0210663 A1 | 7/2014 | Metzler et al. |
| 2014/0257692 A1 | 9/2014 | Stefani et al. |
| 2014/0316616 A1 | 10/2014 | Kugelmass |
| 2014/0371952 A1 | 12/2014 | Ohtomo et al. |
| 2015/0098636 A1* | 4/2015 | Bergman ........... G06K 9/00201 382/128 |
| 2015/0153444 A1 | 6/2015 | Nichols et al. |
| 2015/0259066 A1 | 9/2015 | Johannesson et al. |
| 2015/0370250 A1 | 12/2015 | Bachrach et al. |
| 2016/0073096 A1 | 3/2016 | Hillebrand et al. |
| 2016/0223647 A1 | 8/2016 | Nichols et al. |
| 2016/0247405 A1 | 8/2016 | Paczan et al. |
| 2016/0247407 A1 | 8/2016 | Paczan et al. |
| 2016/0265914 A1 | 9/2016 | Hunter |
| 2016/0291593 A1 | 10/2016 | Hammond et al. |
| 2016/0292693 A1 | 10/2016 | Hammond et al. |
| 2016/0292872 A1 | 10/2016 | Hammond et al. |
| 2016/0304198 A1 | 10/2016 | Jourdan |
| 2016/0333691 A1 | 11/2016 | Puura et al. |
| 2016/0340028 A1 | 11/2016 | Datta |
| 2016/0349746 A1* | 12/2016 | Grau .................... G05D 1/0094 |
| 2017/0031369 A1 | 2/2017 | Liu et al. |
| 2017/0043870 A1 | 2/2017 | Wu |
| 2017/0158320 A1 | 6/2017 | Bosch |
| 2017/0201614 A1 | 7/2017 | Deng et al. |
| 2017/0227162 A1 | 8/2017 | Saika et al. |
| 2017/0305546 A1 | 10/2017 | Ni et al. |
| 2018/0032088 A1 | 2/2018 | van Cruyningen |

FOREIGN PATENT DOCUMENTS

| | | |
|---|---|---|
| EP | 3062066 | 8/2016 |
| EP | 3205977 | 8/2017 |
| FR | 2807603 | 10/2001 |
| JP | 2008304260 | 12/2008 |
| JP | 2008308154 | 12/2008 |
| JP | 2015002450 | 1/2015 |
| KR | 10-1483057 | 1/2015 |
| WO | WO-2012049438 | 4/2012 |
| WO | WO-2016140985 | 9/2016 |

OTHER PUBLICATIONS

Mozas-Calvache et al., "Method for Photogrammetric Surveying of Archaeological Sites with Light Aerial Platforms," Journal of Archaeological Science, 2012, 10 pages.
Bimbaum et al., "Unmanned Aerial Vehicle Security Using Recursive Parameter Estimation," 2014 International Conference on Unmanned Aircraft Systems (ICUAS), May 27-30, 2014, 20 pages.
Vandapel et al., Natural Terrain Classification using 3-D Ladar Data, Proceedings of the 2004 IEEE, International Conference on Robotics and Automation, New Orleans, LA, Apr. 2004, 6 pages.
Becker et al., "LiDAR Inpainting from a Single Image," IEEE 12th International Conference on Computer Vision Workshops (ICCV Workshops), Oct. 4, 2009, 10 pages.

* cited by examiner

TRACKING IMAGE COLLECTION FOR DIGITAL CAPTURE OF ENVIRONMENTS, AND ASSOCIATED SYSTEMS AND METHODS

CROSS-REFERENCE TO RELATED APPLICATION

The present application claims priority to U.S. Provisional Application No. 62/453,965, filed on Feb. 2, 2017 and incorporated herein by reference.

TECHNICAL FIELD

The present technology is directed generally to improving image collection for digital capture of environments, as an example for virtual reality, and associated systems and methods.

BACKGROUND

"Virtual reality" generally refers to computer technologies that use software to generate images and/or other sensory inputs that are representative of a real environment, or simulate an imaginary environment. In order to create a virtual reality environment corresponding to a real environment, the creator must obtain sufficient image data of the real environment. This process can provide a number of challenges. For example, it can be difficult to obtain the large amount of image data required for an accurate representation. In particular, it can be difficult to accurately track which portions of a three dimensional environment have been captured and which have not. Furthermore, particular environments may not be amenable to normal data gathering techniques, and accordingly, it can be challenging to obtain sufficient data in such environments. Therefore, there remains a need for improved techniques for gathering the information required to provide realistic virtual reality simulations.

DETAILED DESCRIPTION

The present technology is directed generally to image collection techniques and more particularly, to systems and methods for tracking image collection data used to digitally capture real world environments, for instance to be displayed in virtual reality. Specific details of several embodiments of the disclosed technology are described below with reference to particular, representative configurations. In other embodiments, the disclosed technology may be practiced in accordance with techniques and associated systems having other configurations. Specific details describing structures or processes that are well-known and often associated with image data collection and virtual reality technology, but that may unnecessarily obscure some significant aspects of the presently disclosed technology, are not set forth in the following description for purposes of clarity. Moreover, although the following disclosure sets forth several embodiments of different aspects of the disclosed technology, several other embodiments of the technology can have configurations and/or components different than those described in this section. As such, the present technology may have other embodiments with additional elements and/or without several of the elements described below with reference to FIGS. 1-11.

Several embodiments of the disclosed technology may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein include suitable data processors and can include internet appliances and hand-held devices, including palmtop computers, wearable computers, cellular or mobile phones, multi-processor systems, processor-based or programmable consumer electronics, network computers, laptop computers, mini-computers and the like. Information handled by these computers can be presented at any suitable display medium, including a liquid crystal display (LCD). As is known in the art, these computers and controllers commonly have various processors, memories (e.g., non-transitory computer-readable media), input/output devices, etc.

The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer discs, as well as distributed electronically over networks. Data structures and transmissions of data particular to aspects of the technology are also encompassed within the scope of the present technology.

1. Overview

Figure 1:
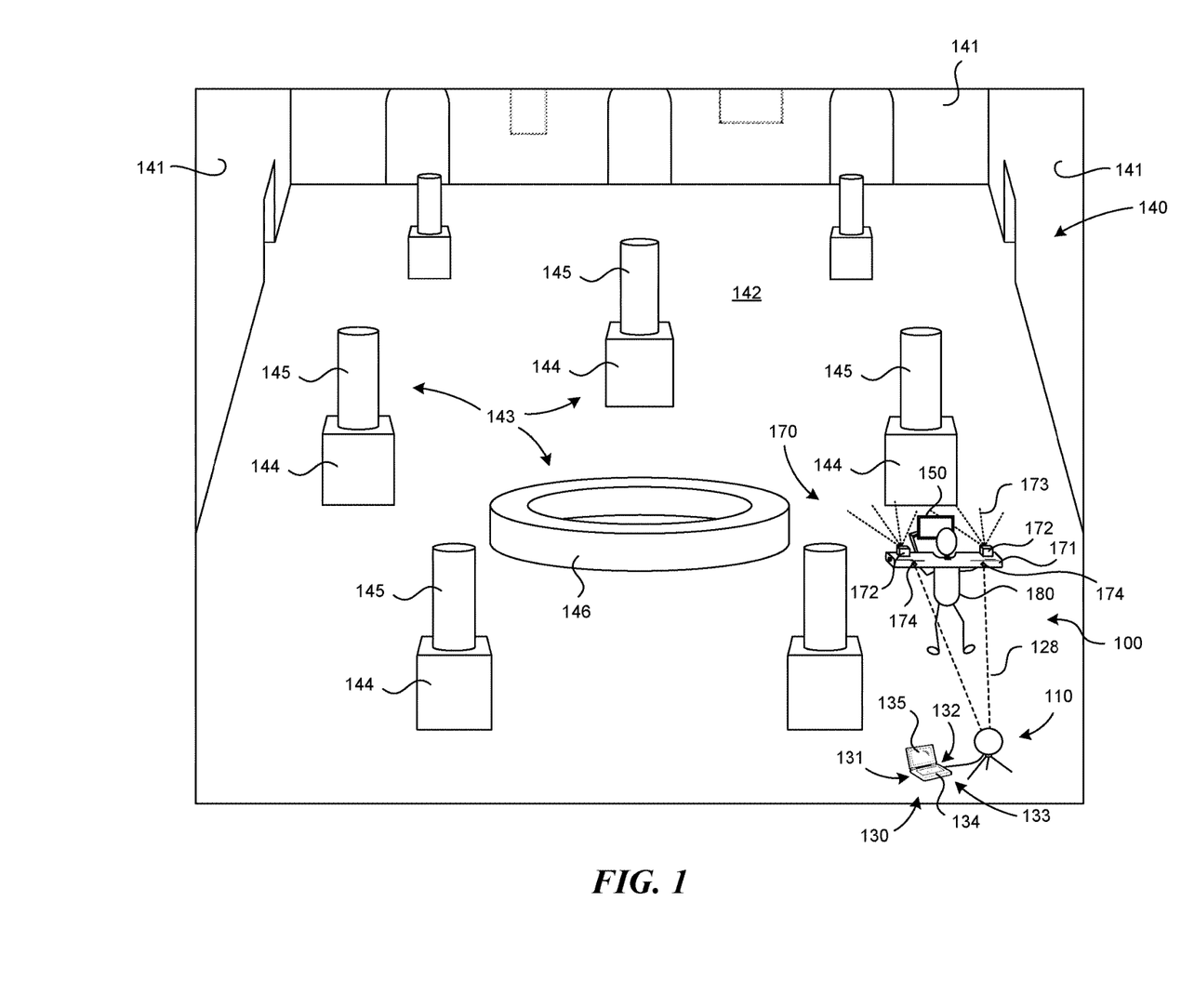
FIG. 1 is a partially schematic illustration of an environment, and a system for capturing data corresponding to the environment, configured in accordance with an embodiment of the present technology.

FIG. 1 is a partially schematic illustration of a real environment 140 which is to be digitally captured. In the illustrated embodiment, the environment 140 includes a museum gallery having walls 141, a floor 142, and objects 143 (e.g. a central ring 146, pedestals 144, and corresponding statues 145, which are shown schematically as cylinders). The primary purpose of collecting image data in the environment 140 is to generate a realistic virtual reality environment that allows the user to experience the real environment 140 via virtual reality goggles, headgear, and/or other suitable devices.

A representative system 100 is configured to generate the image data used to create a virtual reality environment based on the real environment 140. The system 100 can include a data collector 170 that collects the data (e.g., image data), and a scanner 110 that is used to guide the data collection process. In a particular embodiment, the scanner 110, alone or in conjunction with one or more other system elements, is used to collect initial data from the environment 140, plan a series of data collection routes that are used to collect three dimensional data within the environment 140, and then track the data collection process to ensure that the proper data are collected.

As shown in FIG. 1, the data collector 170 can be carried by a human operator 180 who walks through the environment 140 to collect the data required to digitally capture the entire environment for use in a subsequent virtual reality simulation. By using a human operator 180 to carry the data collector 170, the system 100 can be used in environments containing sensitive or delicate objects (e.g. the statues 145, paintings, and/or other objects) where robotic devices such as unmanned aerial vehicles and/or unmanned ground-based vehicles may not be permitted or suitable. At the same time, the automated guidance functions provided by the system 100 can increase the likelihood for a complete data collection process, using the human operator 180.

In a particular embodiment, the data collector 170 includes a sensor support 171 that may be worn, carried and/or otherwise supported by the operator 180, and that in turn supports one or more sensors 172. In an illustrated embodiment shown in FIG. 1, the sensors 172 include two cameras that can be operatively coupled (e.g., via a controller) to provide stereoscopic images of the environment 140. Each camera has a corresponding field of view 173. The sensor support 171 can also include one or more fiducials 174 or other elements that provide a "marker" function. The fiducials allow the scanner 110 to identify the location and orientation of the sensor support 171, and therefore the sensors 172 that it carries. The sensor support 171 can also carry a guidance display 150 that presents information to the operator 180 corresponding to the image collection route along which the operator moves, and/or other information that the operator uses to gather the image data within the environment 140.

The sensor support 171 can include an inertial measurement unit or any suitable number of additional sensors that can improve the system's derived estimate of its position and orientation.

The scanner 110 can include a laser scanner that emits a laser beam 128 and receives the reflected beam. For example, the scanner 110 can direct the beam 128 toward the sensor support 171 and receive reflections from the fiducials 174. Based on the reflected beam data, the scanner 110 can be used to identify the position and orientation of the sensor support 171.

The scanner 110 can include a camera that is directed toward the sensor support 171 and receives light from the fiducials 174. Based on the viewed positions of the fiducials, the scanner 110 can be used to identify the position and orientation of the sensor support 171.

The scanner 110 can be coupled to a controller 130 that, in an illustrated embodiment, includes a laptop computer, and that other embodiments can include other digital processing devices, in addition to or in lieu of the laptop computer. In any of these embodiments, the controller 130 can include a processor 131, memory 132, and input/output devices 133. The input/output devices 133 can include an input device 134 (e.g., a keyboard), and an output device 135 (e.g., a display). The controller 130 can receive the data from the scanner 110, generate one or more image capture routes that the operator 180 follows, and communicate with the operator 180 to keep the operator on the routes and/or redirect the operator as needed. To do so, the controller 130 can present guidance information at the guidance display 150 carried by the sensor support 171. Further details, representative processes, and associated systems are described below.

2. Representative Process Flows

Figure 2:
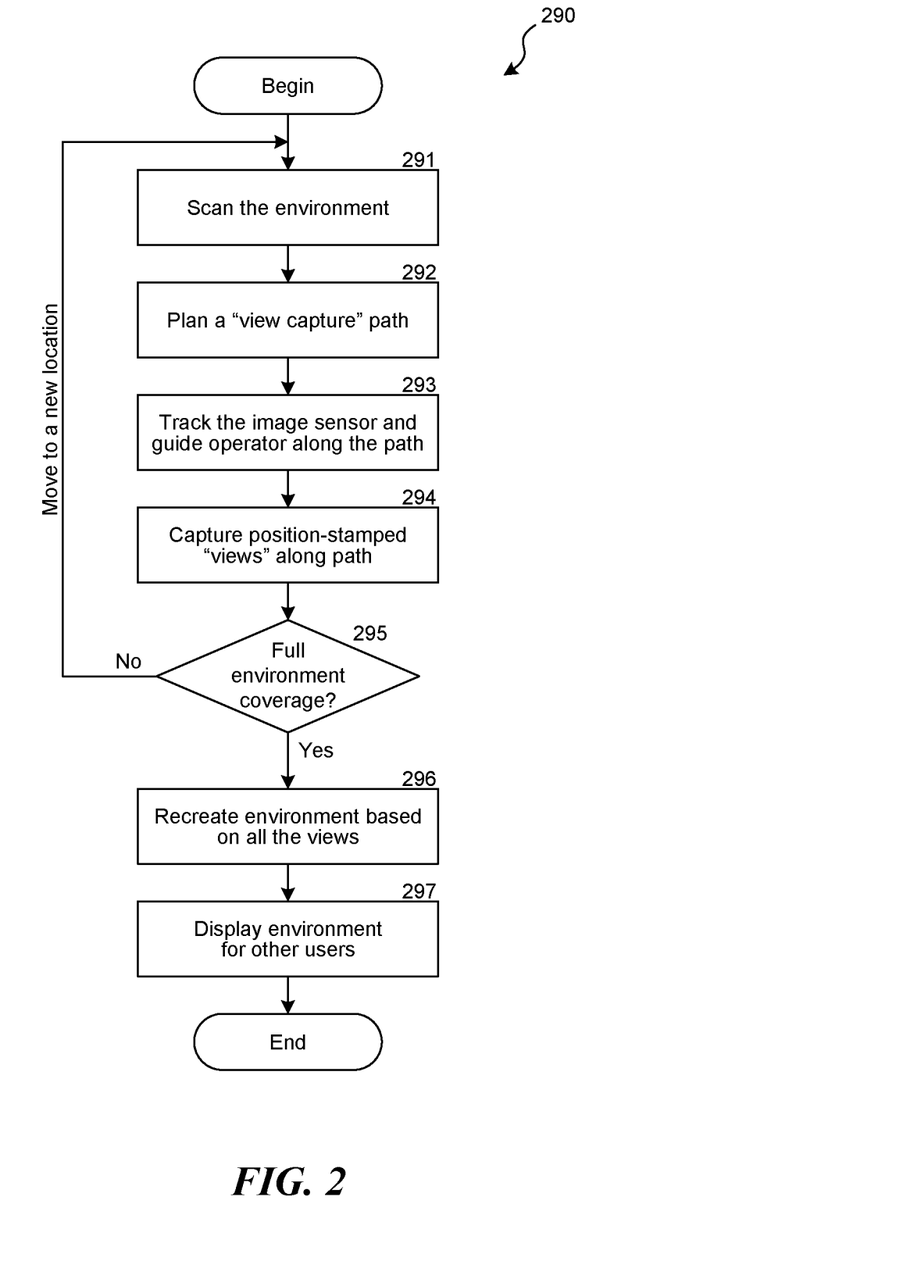
FIG. 2 is a flow diagram illustrating a process for collecting data in accordance with embodiments of the present technology.

FIG. 2 illustrates a representative process 290 configured in accordance with embodiments of the present technology. Block 291 includes scanning the real-world environment that is to form the basis for a corresponding virtual reality environment. This initial scan is used to identify the key features in the environment, which are then used to guide the more thorough data-gathering process that produces the data forming the basis of the virtual reality environment. For example, the process performed at block 291 can include using a laser scanner to scan the major features of the environment from one or more points within the environment. Optionally, this process can further include correlating the scanned data with previously-obtained photographs or other image data obtained from a fixed reference point. In other embodiments, the correlation process can be eliminated.

Block 292 includes planning a view capture path or route. This is the route that the operator 180 (FIG. 1) follows during an image capture operation. The path is planned to capture all the necessary and/or desirable views that can be supported by the scanner at a particular scan position. In particular, the path is planned so as to provide enough visual information to form a realistic experience for the ultimate virtual reality viewer. Because the environment is a three dimensional environment, the process may include multiple view capture paths or routes, which may be based on one or more scan positions, and will be described in further detail later.

Block 293 includes tracking the sensor (e.g., image sensor) and guiding the operator along the view capture path developed at block 292. In particular, the same (or a different) scanner used to scan the environment at block 291 can be used to track the operator's movement through the environment during the data collection process. As the system tracks the operator's movements, it can present feedback (e.g., via the guidance display 150 described above with reference to FIG. 1) to assist the operator in capturing the entire environment.

Block 294 includes capturing views along the path that are pose-stamped. For example, as the operator walks along the path and takes photos (or obtains other sensor information), the system can automatically stamp each image with a location and an orientation. Accordingly, individual pieces or elements of the image data can have associated with them a particular position within the environment and an orientation of the sensor. This information is then used to create a fully three-dimensional rendering for the virtual reality environment.

At block 295, the process includes determining whether the environment has been fully covered. If not, the scanner is likely moved to a new (e.g., second or subsequent) location and the process returns to block 291. If so, then at block 296, the environment is recreated based on the views collected during the forgoing steps. Various known algorithms can be used to recreate this environment, such as a bundle adjustment or photogrammetry process. At block 297, the recreated environment is displayed for users. For example, the recreated environment can be based on light fields, point clouds, and/or mesh data, and can be displayed using a virtual reality device (or other device) or another three-dimensional viewer. Suitable virtual reality devices are available from Oculus VR, LLC (www.oculus.com) and HTC Corporation (www.htc.com). Other suitable three-dimensional viewer media include CAD (computer-aided design) software, web-based software, or the like.

Figure 3:
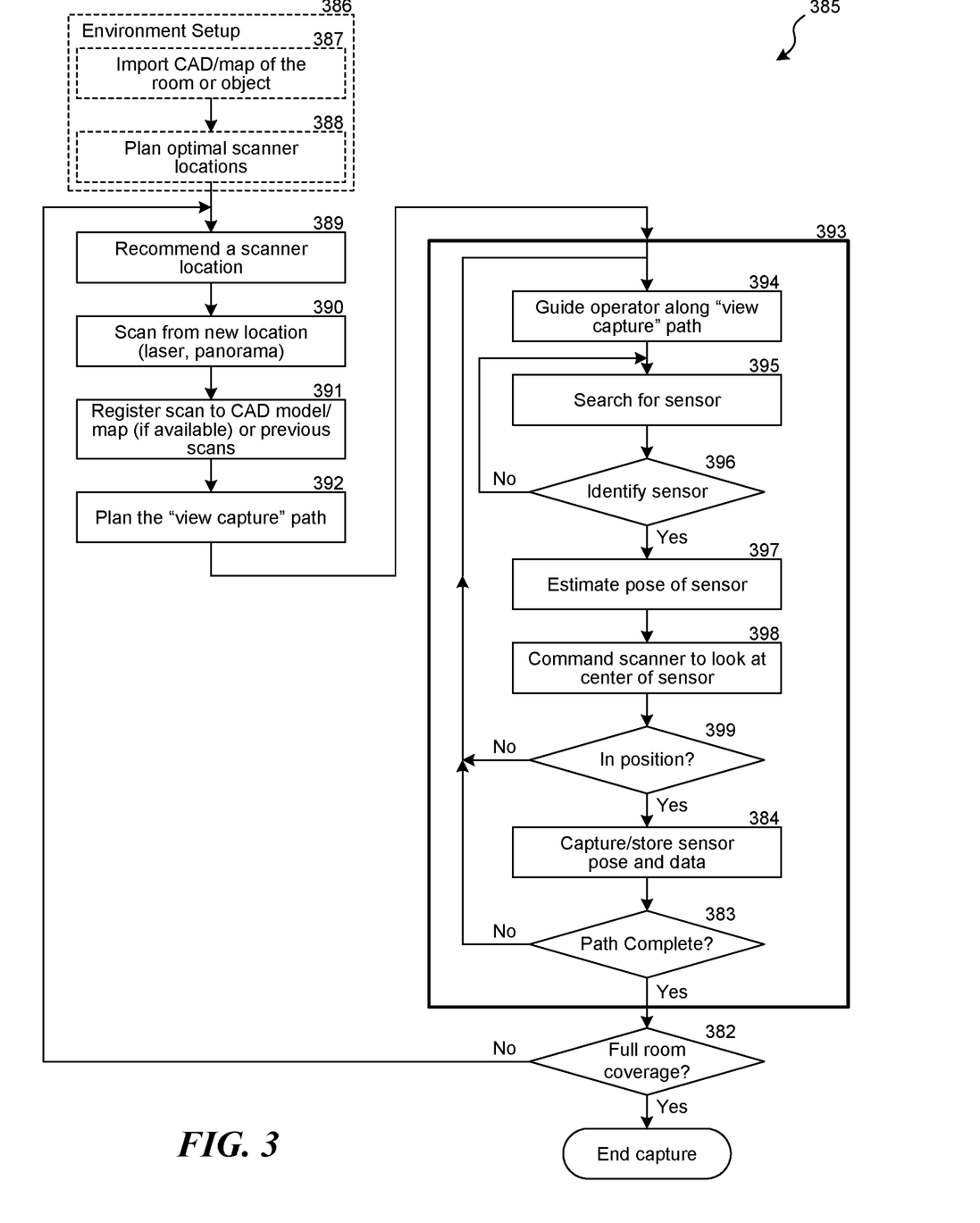
FIG. 3 is a flow diagram illustrating a process for collecting data in accordance with embodiments of the present technology.

FIG. 3 is a flow diagram illustrating a process 385 configured in accordance with another embodiment of the present technology, and including further details of representative process steps. Block 386 includes setting up the real-world environment in preparation for obtaining image data. This process can include importing a CAD image or map of the environment, including objects within the environment (block 387). Block 388 can include planning scanner locations (e.g., one or more fixed and/or optimal locations at which to place the scanner). In particular, and as will be described further bellow with reference to FIG. 4, the shape of the environment and/or the existence of objects within the environment may prevent the scanner from adequately scanning the environment from a single location. Accordingly, block 388 can include identifying the multiple scanner locations required to adequately (e.g., fully) scan the environment, and in particular embodiments, the minimum number of necessary scanner locations to do so.

Based on the information collected at block 386, block 389 includes recommending a scanner location. For example, block 389 can include indicating to an operator where, within the environment, the scanner should be placed. At block 390, the scanner completes a scan, capturing for example, a three-dimensional point cloud of the environment from a fixed location, along with corresponding panoramic photo data. In a particular embodiment, the scanner is a laser scanner, and in other embodiments can include other types of scanning technology. Block 391 includes registering the data obtained in the scan to the map or model obtained at block 387, and/or to previous scans. This process can be used to ensure that the scan of the environment is complete. Then at block 392, the view capture path or route is planned. As discussed above, the path is deliberately constructed to obtain as much data as possible from each scanner location. The path can be calculated based on common algorithms such as the "traveling salesman" or various minimization functions.

Block 393 includes tracking the image sensor and guiding the operator to collect the necessary image data. This process in turn includes guiding the operator along the view capture path (block 394) established at block 392. For example, block 394 can include using the guidance display 150, shown in FIG. 1 and described in further detail below with reference to FIG. 9, to guide the operator as the operator moves from one image collection location to another.

As the operator moves within the environment, blocks 395 and 396 include searching for the image sensor (e.g., searching for the data collector 170 shown in FIG. 1, which carries the camera(s) or other image sensor(s) 172). In a particular embodiment, this process can include panning and tilting the scanner in a methodical pattern until the sensor is identified.

Once the sensor is located, block 397 includes estimating the position and orientation (or pose) of the sensor. In order to accurately create a virtual three-dimensional environment, it is typically required to know both where the sensor is and which way the sensor is pointed when it captures a particular image. For example, a complete image definition can include a six degree of freedom set of data tied to the images at each location. The degrees of freedom include the coordinates of the sensor in three-dimensional space, as well as the direction (in three-dimensional space) in which the sensor points.

At block 398, the process can include commanding the scanner to look at the center of the sensor or the data collector 170 so that the sensor is centered within the field of view of the scanner. This will reduce the likelihood for losing track of the sensor as the operator moves. At block 399, the process determines whether the sensor is in the proper position and orientation. For example, this process can include determining if the operator has reached an intended view capture location, with the sensor pointed in the proper direction. If not, the process returns to block 394 to provide additional guidance to the operator. If so, then at block 384, the process includes capturing and storing both the image data obtained by the sensor, and the position and orientation of the sensor.

At block 383, the process includes determining if a given view capture path has been completed. If it has not, then the process returns to block 394 for additional guidance. If it has, then at block 382, the process determines whether the entire environment has been covered. If it has not, the process returns to block 389 to continue collecting data in the environment from a new scanner location. Once the entire environment has been captured, the process ends.

3. Representative Systems

Figure 4:
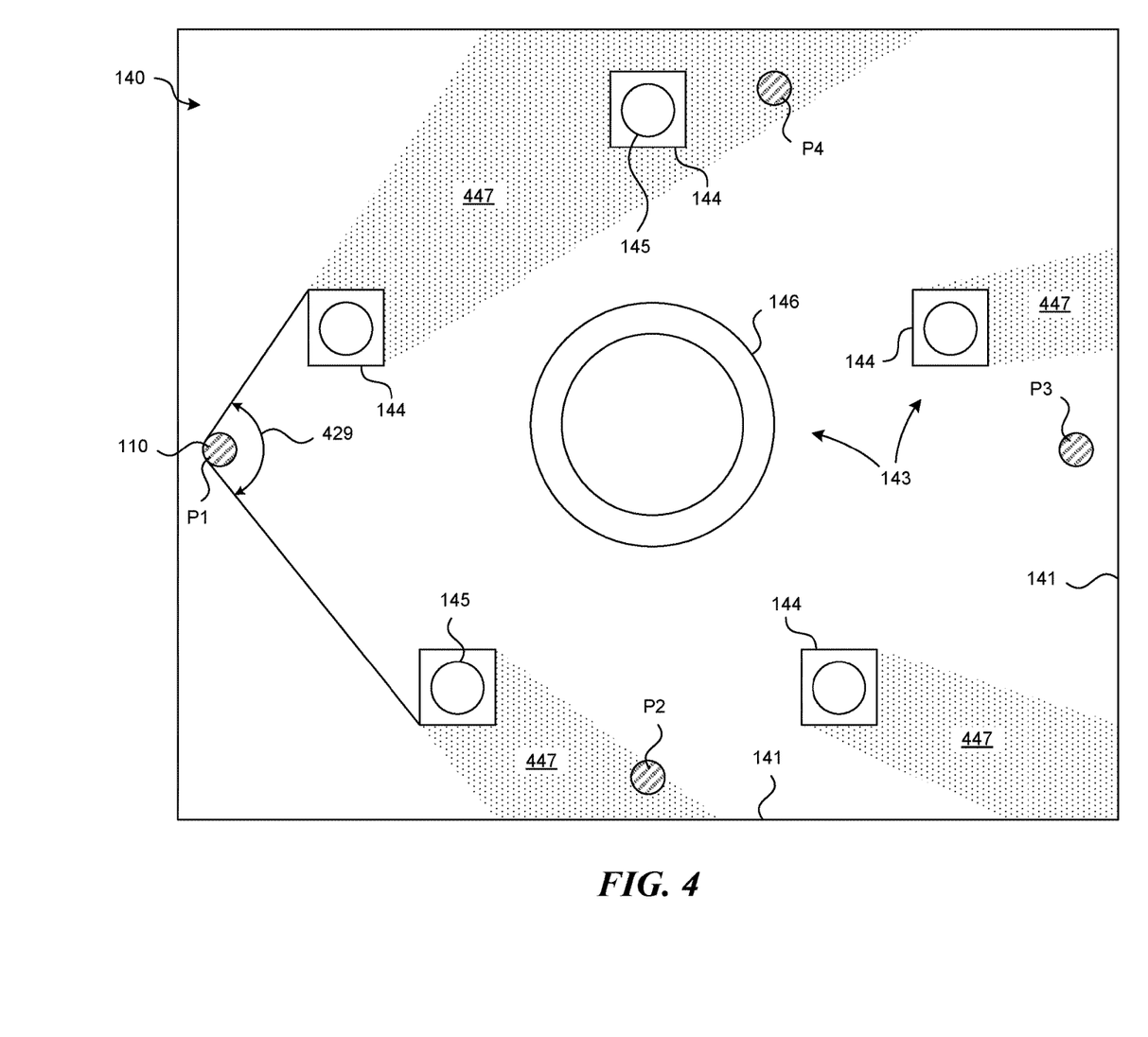
FIG. 4 is a partially schematic, plan view of an environment containing multiple objects and representative scanner locations selected in accordance with embodiments of the present technology.

FIG. 4 is a partially schematic, plan view of the environment 140 shown in FIG. 1. FIG. 4 also illustrates the scanner 110 located at a first position P1, and a scanner field of view 429 associated with position P1 that encompasses a portion of the environment 140. As shown in FIG. 4, each of the objects 143 within the environment 140 can cast a "shadow" or occluded area 447 in which the scanner 110 is unable to obtain data or track the operator. The extent of the shadow 447 depends upon the three-dimensional shape and position of each object 143. For example, the ring 146 in the center of the environment 140 is relatively low and therefor casts little or no shadow. Conversely, the surrounding pedestals 144 and statues 145 can cast more significant shadows 447. In order to digitally capture the entire environment, the surfaces that are in shadow when the scanner 110 is at location P1 must be imaged. Accordingly, and as discussed above, part of the process disclosed herein includes identifying additional locations for the scanner 110 so as to support capturing all relevant image data within the environment 140. In a representative embodiment, the additional positions (three are shown as P2, P3, and P4) are located along the corresponding walls 141 of the environment 140. In other embodiments, the positions may be different and/or may be fewer. The fewer the positions, the less time and effort is required to set up, move, and take down the scanner 110. Accordingly, a representative process includes optimizing (e.g., minimizing) the number of locations at which the scanner 110 must be placed to provide adequate coverage of the environment 140. For example a graph search algorithm can be used to minimize a function over the area.

Figure 5:
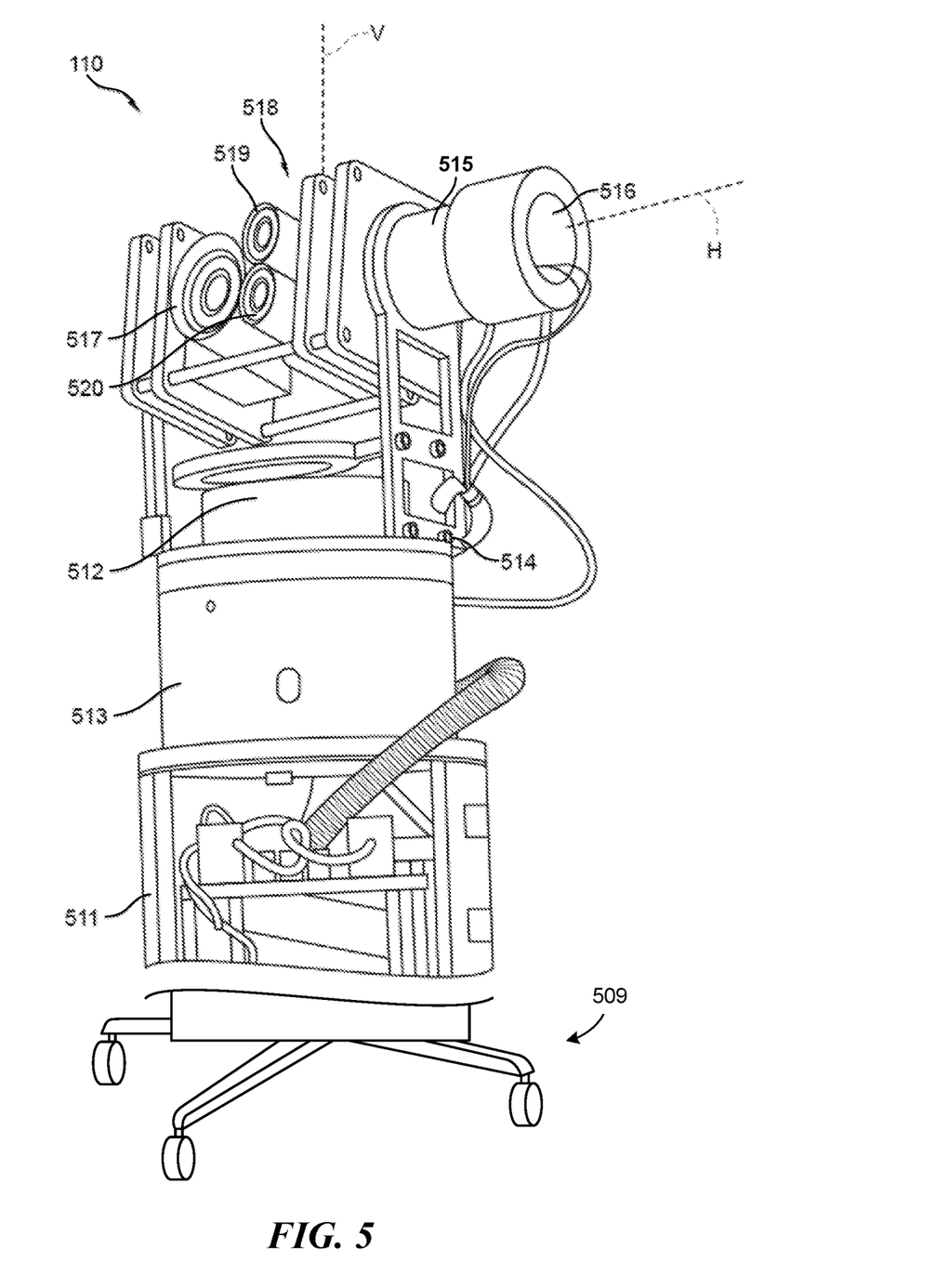
FIG. 5 is a partially schematic illustration of a representative scanner configured in accordance with embodiments of the present technology.

FIG. 5 is an isometric illustration of a representative scanner 110 having features configured in accordance with embodiments of the present technology. The scanner 110 can include a support 511 that carries a camera 517 and a rangefinder 518. The camera 517 can be configured to produce two-dimensional optical images of the environment around the scanner 110 by receiving radiation from the environment in the visible spectrum, infrared range, and/or other suitable frequency ranges. The rangefinder 518 can include an emitter 519 and a receiver 520. The emitter 519 emits a signal that reflects from an object in the environment and is received by the receiver 520. The distance from the scanner 110 to the object is then determined or estimated by using any of a variety of suitable techniques, including estimating the amount of time required for the signal to transit from the emitter 519 to the object and back to the receiver 520 ("time of flight"). Accordingly, the camera 517 can identify and transmit two-dimensional information about the environment, and the rangefinder 518 can add the third dimension. The scanner 110 can include wheels 509 (e.g., with releasable locks or brakes) and/or other mobility features to facilitate moving the scanner 110 from one location to another within the environment.

The camera 517 and the rangefinder 518 can be carried by a tilt stage 514 and can be moved together as a unit to scan the environment around the scanner 110. The tilt stage 514 carries a tilt motor 515 that rotates the camera 517 and the rangefinder 518, as a unit, about a first axis (e.g., a horizontal axis H). A corresponding tilt encoder 516 tracks the motion of the camera 517 and the rangefinder 518 relative to the horizontal axis H. A pan motor 512 carried by the support 511 rotates the tilt stage 514 (including the camera 517 and the rangefinder 518) as a unit about a second axis (e.g., a vertical axis V). A pan encoder 513 tracks the rotational position of the camera 517 and the rangefinder 518 around the vertical axis V. Accordingly, the pan motor 512 and the tilt motor 515 can rotate the camera 517 and the rangefinder 518 through arcs sufficient to cover a roughly hemispherical volume around the scanner 110.

In a particular embodiment, the rangefinder 518 can include a LIDAR detector, which emits and receives laser light (e.g., IR laser light). Suitable LIDAR detectors have range capabilities in the hundreds of meters, depending on factors that include the size of the emitter 519 and receiver or detector 520, and the ranging technology used. In a more confined, indoor environment, scanners with a more limited range can be suitable. As discussed above, the ranging technology can include a time of flight technique in some embodiments. In other embodiments, other techniques, such as SETS techniques, can produce suitable results without requiring direct time of flight calculations, at lower cost and lower (but still suitable) resolution. The scans can be conducted in a methodical sweep pattern, or a coarse scan followed by a detailed scan, or an adaptive scan (e.g., as described in pending U.S. Patent Application Publication No. 2016/0292872, incorporated herein by reference), or via another suitable technique. In other embodiments, the rangefinder 518 can emit signals other than a laser signal, suitable for detecting the distance between the scanner 110 and the objects around it. For example, a radar signal can be used for tracking, though it is expected that a laser signal will out-perform a radar signal for scanning. In another embodiment, the laser scanner can be replaced by multiple high-resolution cameras or a structured light arrangement to perform the scanning process.

Figure 6:
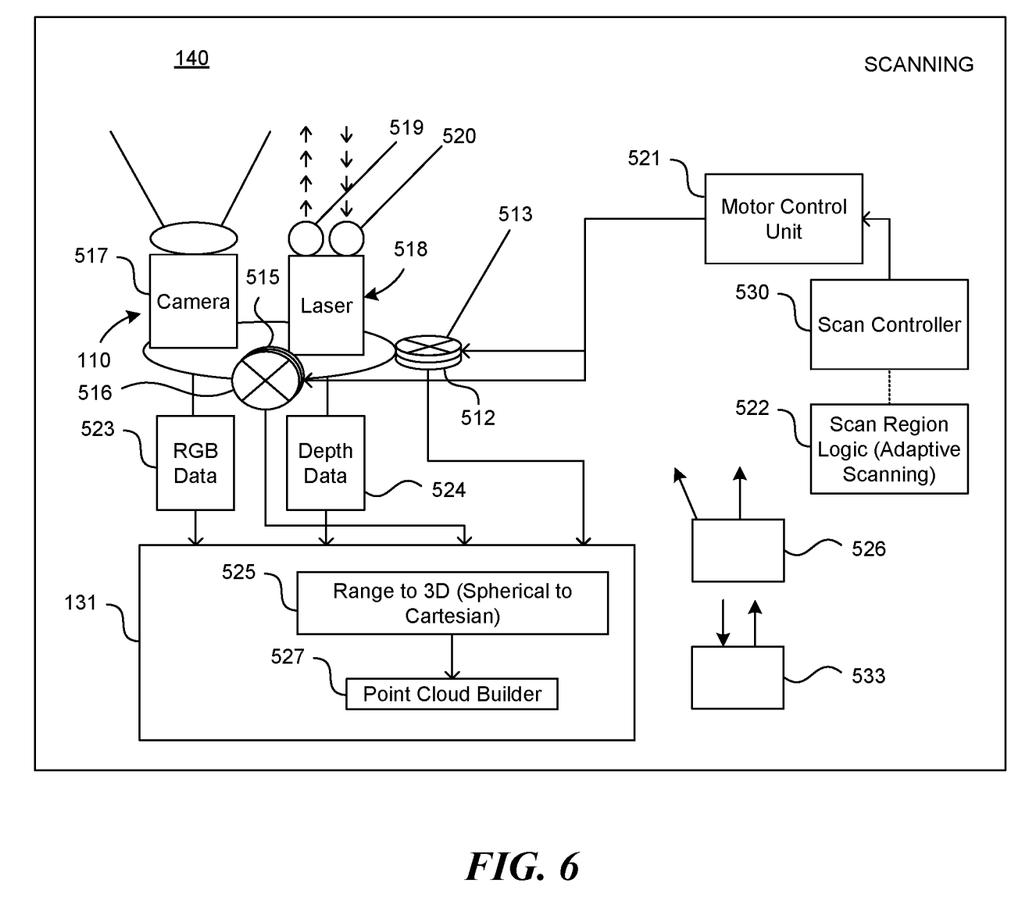
FIG. 6 is a block diagram illustrating components of a representative scanner operating in a scanning mode, in accordance with representative embodiments of the present technology.

FIG. 6 is a schematic block diagram illustrating a representative system operating in a scanning mode in accordance with an embodiment of the present technology. As shown in FIG. 6, the camera 517 records images of the surrounding environment 140, while the rangefinder 518 records the distances to the objects within the environment 140. The camera 517 accordingly generates RGB data (or other optical data) 523 and the rangefinder 518 generates depth or distance data 524. The RGB data 523 is transmitted to the processor 131. Optionally, the depth data 524 is converted from spherical coordinates to Cartesian coordinates at the processor 131 using conventional converter logic 525 that operates on information from the tilt encoder 516 and the pan encoder 513. This transformed coordinate information is used to generate a point cloud from the data captured by the camera 517 and the rangefinder 518 using the point cloud builder logic 527.

The system can also include a motor control unit 521 that provides instructions to the tilt motor 515 and the pan motor 512, and is itself under the control of a scan controller 530. The scan controller 530 can include scan region logic 522 and can be a stand-alone controller, or it can be integrated with one or more other controllers, e.g., the controller 130 described above with reference to FIG. 1.

A power supply 526 provides power to the various components of the system. An input/output device 533 receives information from an operator and provides output information to the operator. The result of the process performed during the scanning mode shown in FIG. 6 can include a computer-based model (e.g., a point cloud) of the environment 140.

In particular embodiments, the data obtained during the scanning operation and used to build the three-dimensional model can be supplemented with additional data. For example, the model can be augmented or enhanced with photographs or other sensor readings taken by the scanner camera 517 or another device. This operation can be conducted in real time in some embodiments, and offline in others. The enhancement can include adding the color information contained in the camera image to the points in the point cloud to produce a more realistic, colored model displaying the spectral representation at each point.

The data obtained from a particular scan can be stored and used later by the same scanner (e.g., in a track mode), or by a different scanner, also in the track mode. In a particular embodiment, when a tracker is positioned in a particular area, it can automatically access prior scans made of that environment, and those scans can be downloaded to the scanner as it operates in the track mode.

Figure 7:
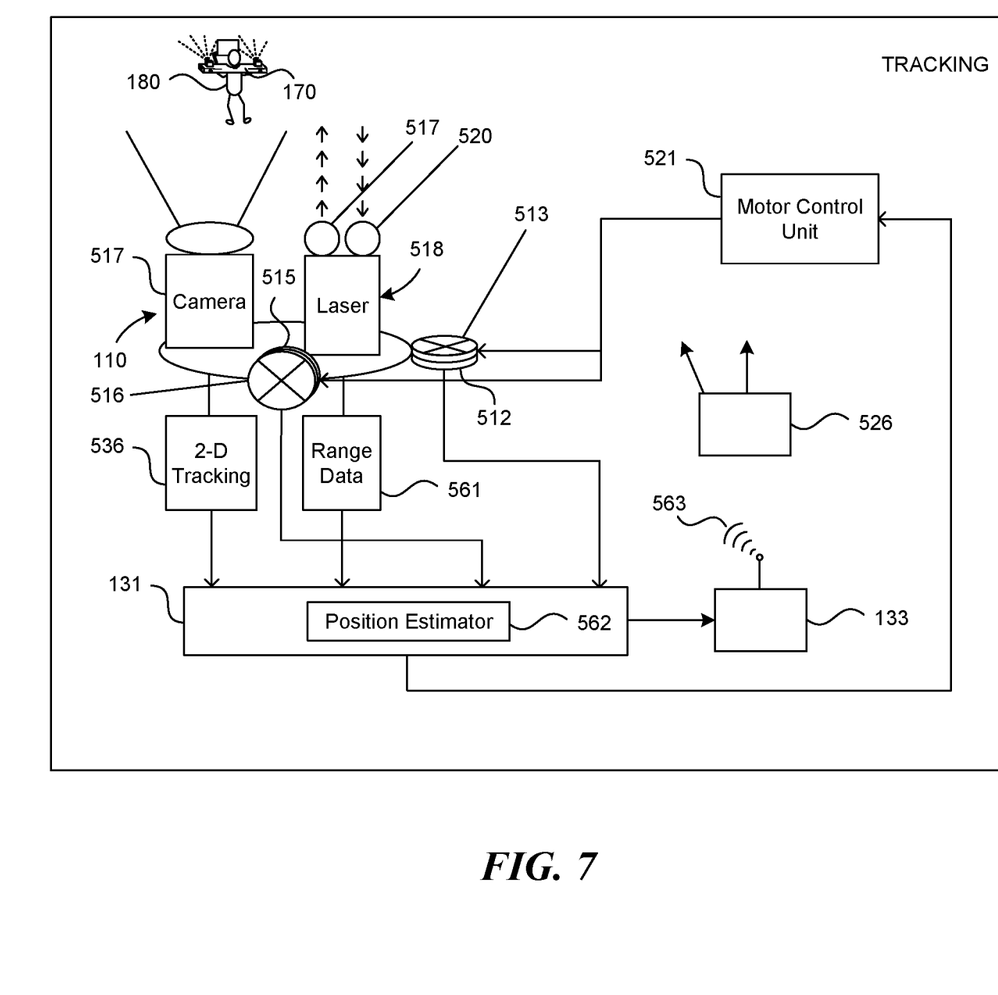
FIG. 7 is a block diagram illustrating components of a representative scanner operating in a tracking mode, in accordance with embodiments of the present technology.

FIG. 7 illustrates a representative system operating in a tracking mode. In this mode, the camera 517 identifies the operator 180 (and/or the data collector 170 carried by the operator), e.g., by tracking one or more fiducials. The fiducials(s) can include an LED or reflector carried by the data collector 170. The result can include two-dimensional tracking data 536. Simultaneously, the rangefinder 518 generates range data 561 corresponding to the distance between the scanner 110 and the data collector 170 as the operator 180 moves around. This information is provided to the processor 131 which generates an estimate of the position of the data collector 170 using position estimator logic 562. The position information can be transmitted to the I/O device 133, which can transmit the information via an information signal 563 to the data collector 170. With this information, the operator 180 can modify, adjust, and/or compensate for variations in the capture route he/she follows. The position information is also transmitted to the motor control unit 521 which actuates the pan motor 512 and tilt motor 515 to continuously keep the data collector 170 within the field of view of the camera 517 and in front of the rangefinder 518 as the UAV operator 180 moves.

Figure 8:
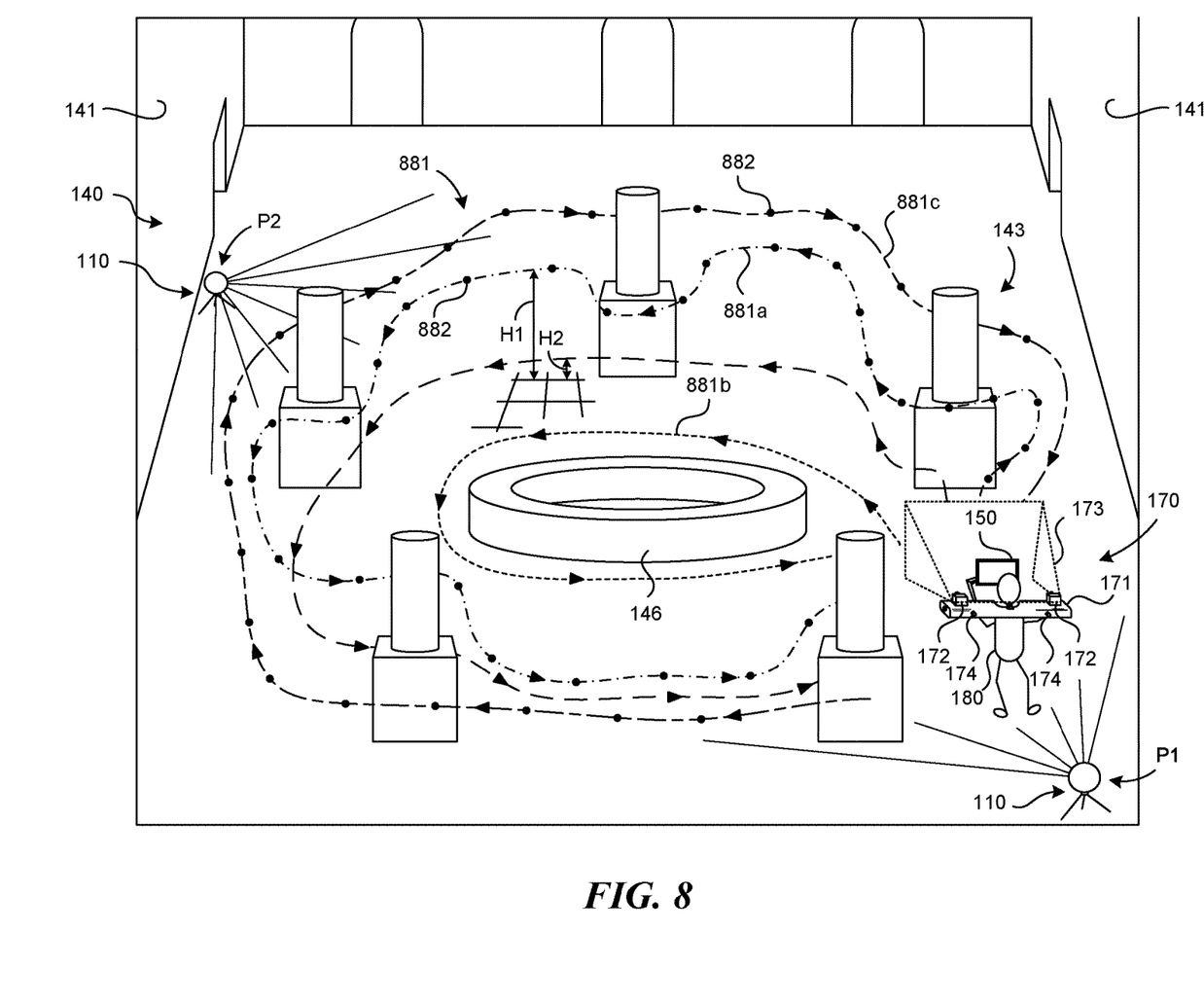
FIG. 8 is a partially schematic illustration of an operator moving along one or more image capture routes in accordance with embodiments of the present technology.

FIG. 8 is a partially schematic, isometric illustration of a representative environment 140 in which an operator 180 moves a data collector 170 around multiple objects 143 to collect data, with guidance provided by information from the scanner 110. The scanner 110 is shown in both a first position P1 and second position P2. As will be described below, the system can guide the operator 180 along certain view capture routes 881 when the scanner 110 is in the first position P1, and the along other routes when the scanner 110 is in the second position P2.

With the scanner 110 in the first position P1, the operator 180 can move along a first view capture route 881a that passes in front of the surfaces of the objects 143 facing toward the ring 146. The operator 180 can direct the sensors 172 to sense data at a mid-level height H1 (e.g., five feet and above). Along the first view capture route 881a are multiple data collection points 882 at which the operator 180 directs the data collector 170 to collect data. For example, depending on the embodiment, the operator 180 can sweep the data collector 170 (e.g., by twisting, pivoting, bending or otherwise changing posture), or the sensors 172 can pivot, tilt, and/or sweep by moving relative to the sensor support 171, automatically, or in response to a command by the operator 180.

As the operator 180 moves the data collector 170, the scanner 110 receives information corresponding to the position and orientation of the data collector 170, e.g. via emitted beams reflected by the fiducials 174, to guide the operator's movements. The environment 140 may contain information that is not readily obtained along the first view capture route 881a. For example, objects close to the floor 142, such as the ring 146, may not be captured when the data collector is held five feet above the ground. Accordingly, the operator may be guided along a second route 881b with the sensors 172 directed to a lower level H2, and with the route directed to and around objects having features at these lower levels.

The first and second routes 881a, 881b include data collection points at positions where the scanner 110 can detect the position and pose of the data collector 170. As a result of the shadow effect discussed above, certain objects or surfaces of objects may not be visible to the scanner 110 when the scanner is at the first position P1. Accordingly, the scanner 110 can be moved to the second position P2 to facilitate directing the operator 180 along a third route 881c to collect data corresponding to objects or object surfaces that were hidden from scanner access at the first position P1. As discussed above, the scanner 110 can then be moved to whatever number positions (e.g., the minimum number positions) are required to fully capture the environment 140.

Figure 9:
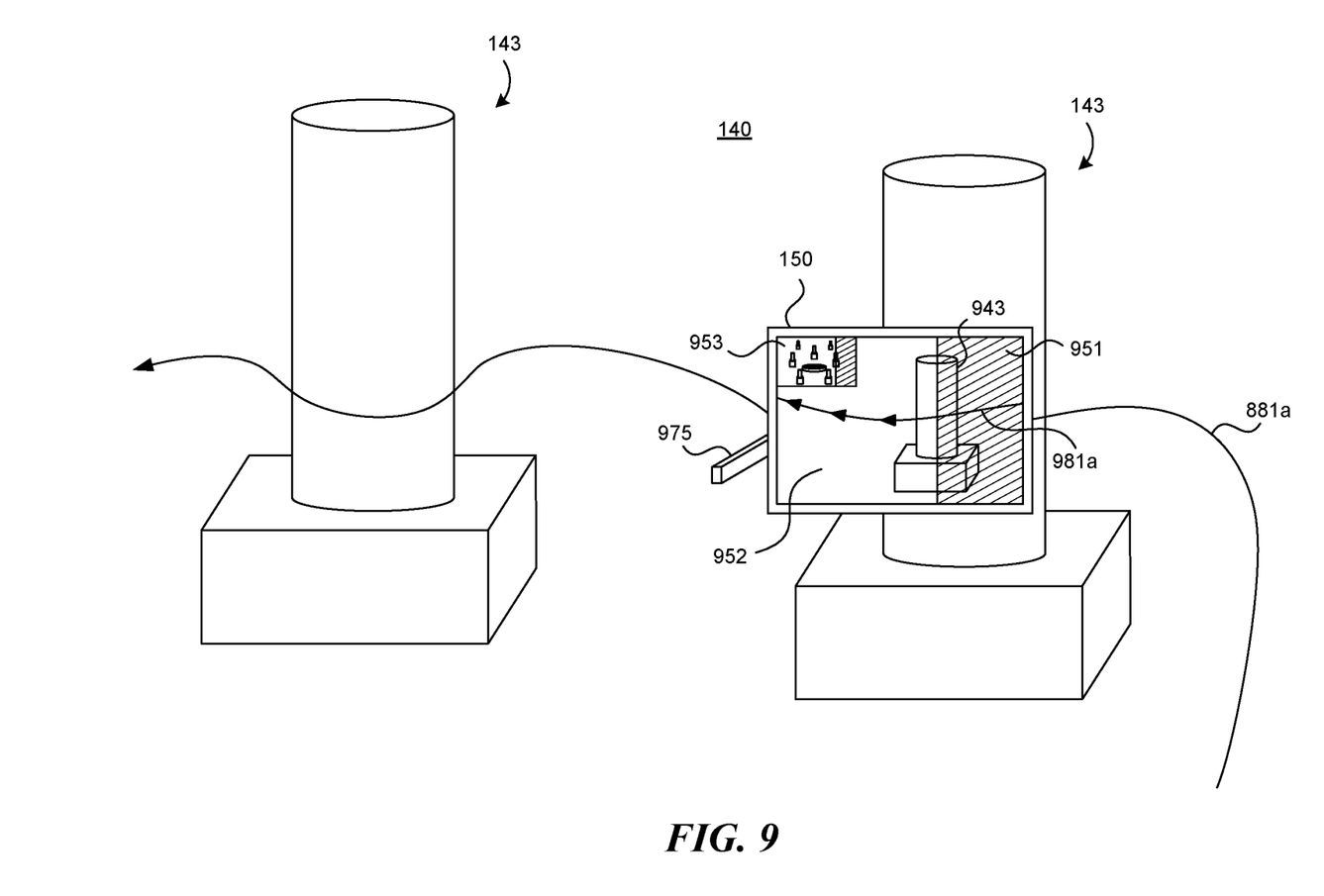
FIG. 9 is a partially schematic, isometric illustration of an object display presented to an operator in accordance with embodiments of the present technology.

FIG. 9 illustrates a portion of the environment 140 including two objects 143 and a portion of the first view capture route 881a. FIG. 9 also illustrates a representative image presented at the guidance display 150 for assisting the operator in moving and orienting the data collector (to which the guidance display 150 is attached via a display arm 975). In a particular embodiment, the guidance display 150 shows a particular portion of the environment 140 including an object display 943 (corresponding to the object 143 in front of the data collector), an imaged region 951 (corresponding to a region of the environment that has already been imaged), and an un-imaged region 952 (corresponding to a region of the environment that has yet to be imaged). The imaged and un-imaged regions can be presented differently, e.g., via shading, color vs. grayscale, or another suitable approach. The display 150 can also present a route display 981a corresponding to the relevant portion of the first view capture route 881a. A portion of the route includes arrows (e.g., in the un-imaged region 952) indicating to the operator that he/she should move in the direction indicated by the arrows to capture the un-imaged region 952. The portion of the route display 981a in the imaged region 951 can be displayed differently, e.g., without arrows, indicating that it has already been covered. Accordingly, by viewing the guidance display 150, the operator can easily recognize and distinguish between imaged regions 951 and un-imaged reasons 952, and can be guided to image those regions that have not yet been imaged. If the operator "misses" a particular location or region in the environment 140, the system can guide the operator via the guidance display 150, to capture the missing image and/or other data. In addition, an overview window 953 presents an overview of the entire environment 140 to orient the operator, and indicate on a more global level, which regions of the environment have been imaged and which have not.

Figure 10:
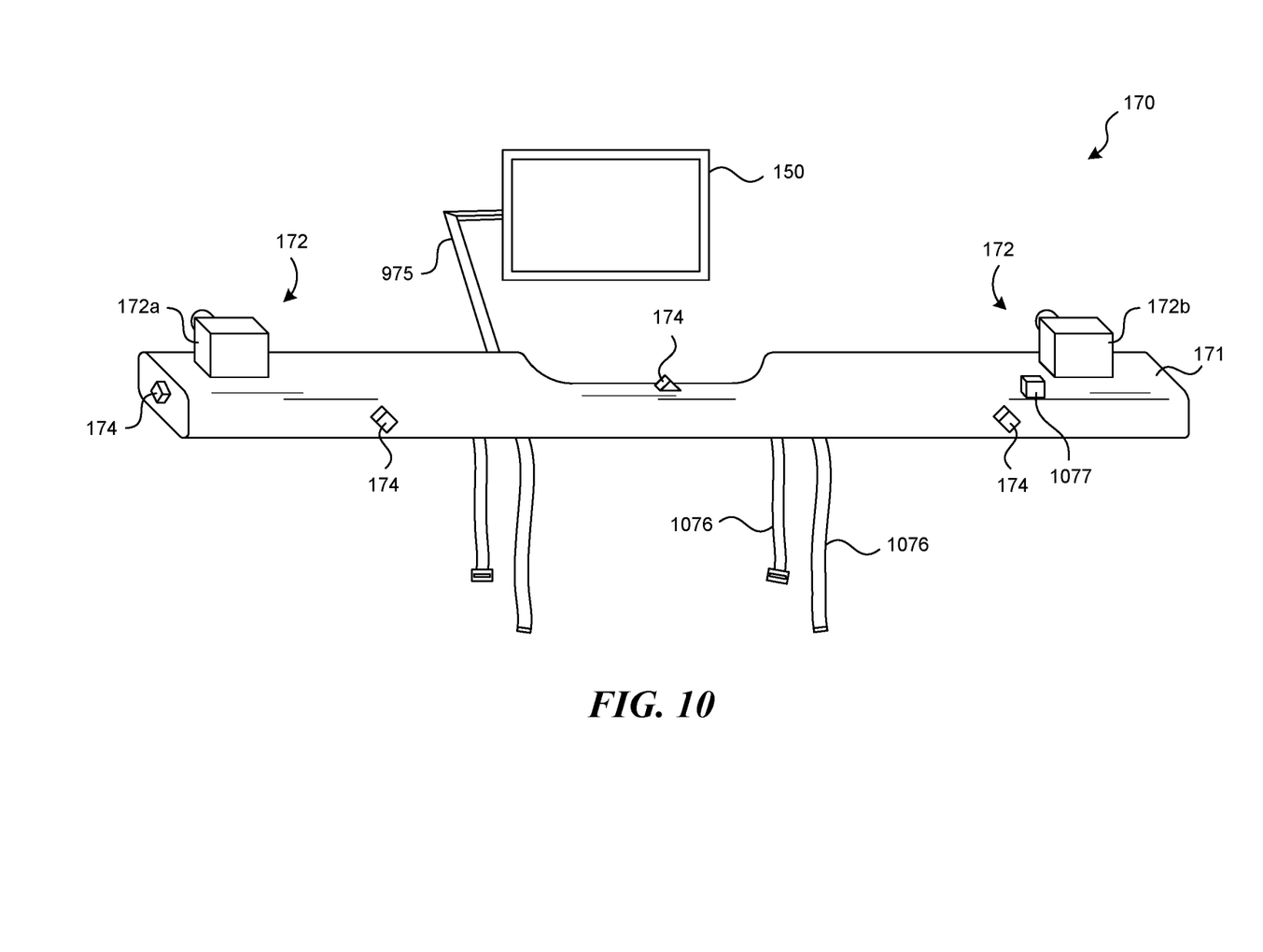
FIG. 10 is a partially schematic illustration of a data collector configured to be carried by an operator in accordance with embodiments of the present technology.

FIG. 10 is partially schematic, isometric illustration of a representative data collector 170 configured in accordance with an embodiment of the present technology. The data collector 170 can include a sensor support 171 configured to be worn by the user (in this case, across the user's shoulders) and straps 1076 or other support elements to temporarily attach the sensor support 171 to the operator. The data collector 170 can include one or more sensors 172, illustrated as a first camera 172a and a second camera 172b. The cameras can be operated at any suitable wavelength, corresponding to the desired output in which the data will be presented. In a particular embodiment, the data collector 170 includes two sensors 172 to provide a stereoscopic image, and in other embodiments, the data collector 170 can include other number of sensors 172 and/or sensors having configurations other than cameras. For example, the sensor(s) 172 can include a LIDAR sensor, and/or other types of sensors that both emit signals and receive signals (e.g., reflected signals). The guidance display 150 is supported in position by the display arm 975 so is to be visible to the operator. Fiducial(s) 174 can be positioned at multiple locations on the data collector 170 so that when interrogated by the scanner 110 (FIG. 1), the location and orientation of the data collector 170 (and therefore the sensors 172) can be readily obtained from a variety of angles.

The data collector 170 can include other locator elements in addition to the fiducials 174 described above. For example, the data collector 170 can include a position sensor 1077 (e.g., an inertial measurement unit or IMU) that can be used to supplement location and/or orientation information provided by information received from the fiducials 174.

Figure 11:
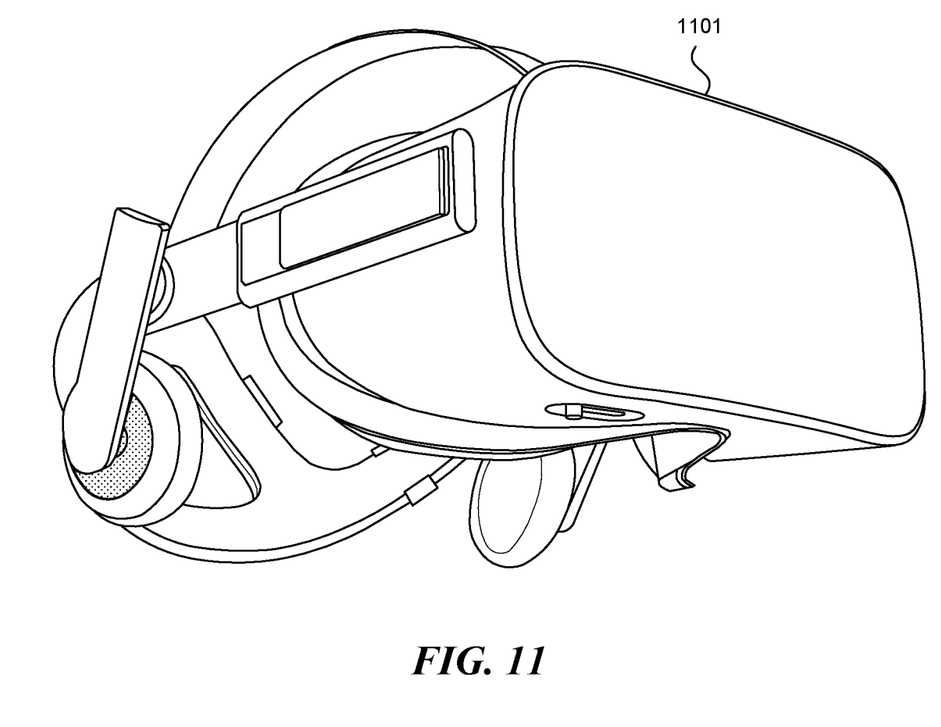
FIG. 11 is an isometric illustration of a representative head-mounted virtual reality display suitable for viewing virtual reality environments created in accordance with embodiments of the present technology.

After the image data described above have been obtained, the data are stored (e.g., in a database) and processed to form a digital representation of the environment. The digital environment can be presented to a user in virtual reality via a head mounted display 1101, such as is shown in FIG. 11. In other embodiments, the digital environment can be displayed and/or presented via other devices or modalities, e.g., a monitor or multiple large monitors that are combined with a head tracking setup.

Aspects of the present technology are expected to provide one or more of several advantages when compared to other technologies used to capture real world environments and display them digitally. For example, as discussed above, certain environments may contain sensitive objects that may be inadvertently damaged if rendered with a fully automated system. By keeping a human operator in the loop, such damage can be avoided.

In addition, the amount of data required to realistically simulate an environment in a virtual reality setting is very large. One potential approach to obtaining such data is to use light field techniques. In accordance with such techniques, instead of rendering a surface, multiple rays are used to simulate what would strike a viewer's retina. The field of rays is generated at a sufficient number of points that a user can move around the virtual reality environment and sense objects from different perspectives, just as the user would in a real environment. However, available light field cameras may not be suitable for particular environments. In particular, if light field cameras are limited to a fixed position, they are not likely to capture sufficient information to render a realistic virtual reality environment (for example, capturing an entire room). If such cameras are mounted on a gantry or a robotic arm, the expense and/or potential for damage to the environment can outweigh the benefit associated with a more realistic rendering. Light field arrays, with corresponding multiple lenses, may also suffer from the same drawbacks.

By contrast, the human operator/carried data collector can operate in a wide variety of environments, with no (or significantly reduced) potential for damage to those environments. The data collector can be portable and lightweight (e.g., five pounds or less), so that an operator can easily capture images, from a wide variety of perspectives and/or heights. Such a system is expected to be considerably less expensive than a gantry or robotic system. Such a system is also expected to be more compatible with the local environment than a drone-based system, which risks damage to the environment either by striking elements of the environment with props, or disturbing the environment with prop wash.

From the foregoing, it will be appreciated that specific embodiments of the present technology have been described herein for purposes of illustration, but that various modifications may be made without deviating from the technology. For example, the scanners described above may use beams other than laser beams. The cameras described above may operate in the visual spectrum, or at other wavelengths. The fiducials can be attached to any suitable element of the data collector, e.g., the sensor support and/or the sensor(s).

Certain aspects of the technology described in the context of particular embodiments may be combined or eliminated in other embodiments. For example, a data processor can operate with scanners of types other than those described above, and representative scanners described above can operate with data processors of types other than those described above. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

To the extent that any materials incorporated herein by reference conflict with the present disclosure, the present disclosure controls. As used herein, the phrase "and/or" as in "A and/or B" refers to A alone, B alone, and both A and B.

We claim:

1. A method for digitally capturing a real-world environment, the method comprising:
    receiving a map of the environment;
    identifying multiple scan locations within the environment;
    scanning the environment to obtain scan data, from individual scan locations;
    comparing the scan data to the map of the environment;
    based at least in part on the scan data, creating a view capture route corresponding to a path in the environment;
    receiving optical data from an optical sensor carried by a human operator, as the human operator moves bodily along the view capture route;
    receiving, from a scanner system at a fixed position within the environment position and orientation data corresponding to the optical sensor, at multiple points along the view capture route while the human operator moves bodily along at least a portion of the view capture route;
    tracking the human operator's progress along the view capture route based on the position and orientation data;
    based at least in part on tracking the human operator's progress along the view capture route, providing guidance cues configured to direct bodily movement of the human operator along the view capture route; and
    based at least in part on the optical data, generating a 3-D, viewable, virtual representation of the environment.

2. The method of claim 1 wherein:
    the fixed position is a first fixed position;
    the position and orientation data are first position and orientation data; and
    the method further comprises receiving, from the scanner system at a second fixed position in the environment, second position and orientation data corresponding to the optical sensor while the human operator moves along a different portion of the view capture route.

3. The method of claim 1 wherein the guidance cues include a route display showing portions of the view capture route that the human operator has moved along together with portions of the view capture route that the human operator has not moved along, wherein the portions of the view capture route that the human operator has moved along are presented differently from the portions of the view capture route that the human operator has not moved along.

4. The method of claim 1 wherein the guidance cues comprise at least one indicator visually representing a direction for the human operator to move bodily along.

5. The method of claim 1 wherein the view capture route is a first view capture route, and wherein the method further comprises creating a second view capture route, the second view capture route being different than the first view capture route.

6. The method of claim 1 wherein scanning the environment includes scanning the environment from a first fixed point to obtain first scan data, and wherein the method further comprises scanning the environment from a second fixed point, different than the first fixed point, to obtain second scan data not accessible to the scanner system from the first fixed point.

7. The method of claim 6 wherein the second scan data corresponds to a shadow region for the scanner system when the scanner system is at the first fixed point.

8. The method of claim 1 wherein the optical data includes stereoscopic optical data.

9. The method of claim 1, further comprising tracking motion of the optical sensor as the human operator travels along the view capture route.

10. The method of claim 9 wherein the optical sensor is carried by a sensor support, and wherein tracking motion includes tracking motion of a fiducial also carried by the sensor support.

11. The method of claim 1 wherein receiving optical data includes receiving optical data correlated with a particular location in the environment and a particular pose of the optical sensor.

12. A method for digitally capturing a real-world environment, the method comprising:
   identifying multiple scan locations within the environment;
   scanning the environment with a scanner system to obtain scan data, from individual scan locations;
   based at least in part on the scan data, creating a view capture route corresponding to a path in the environment;
   receiving optical data from an optical sensor carried by a human operator, as the human operator travels along the view capture route;
   receiving, from the scanner system, position and orientation data corresponding to the optical sensor, at multiple points along the view capture route;
   tracking the human operator's progress along the view capture route based at least in part on the position and orientation data;
   based at least in part on tracking the human operator's progress along the view capture route, providing guidance cues to direct the human operator along the view capture route, including presenting a visual display to the human operator showing regions of the environment for which optical data has been obtained together with regions of the environment for which optical data has not been obtained;
   based at least in part on the optical data, generating a 3-D, viewable, virtual representation of the environment.

13. The method of claim 12 wherein the scanner system is separate from the optical sensor carried by the human operator.

14. The method of claim 12 wherein the regions of the environment for which optical data has been obtained are presented differently from the regions of the environment for which optical data has not been obtained.

15. The method of claim 12 wherein the view capture route is a first view capture route, and wherein the method further comprises creating a second view capture route, the second view capture route being different than the first view capture route.

16. The method of claim 12 wherein scanning the environment includes scanning the environment from a first fixed point to obtain first scan data, and wherein the method further comprises scanning the environment from a second fixed point, different than the first fixed point, to obtain second scan data not accessible to the scanner system from the first fixed point.

17. The method of claim 16 wherein the second scan data corresponds to a shadow region for the scanner system when the scanner system is at the first fixed point.

18. The method of claim 12 wherein the optical data includes stereoscopic optical data.

19. The method of claim 12, further comprising tracking motion of the optical sensor as the human operator travels along the view capture route.

20. The method of claim 19 wherein the optical sensor is carried by a sensor support, and wherein tracking motion includes tracking motion of a fiducial also carried by the sensor support.

21. The method of claim 12 wherein receiving optical data includes receiving optical data correlated with a particular location in the environment and a particular pose of the optical sensor.

* * * * *